United States Patent [19]

Lemelson

[11] 4,257,755
[45] Mar. 24, 1981

[54] MOLDING SYSTEM AND METHOD

[76] Inventor: Jerome H. Lemelson, 85 Rector St., Metuchen, N.J. 08840

[21] Appl. No.: 912,421

[22] Filed: Jun. 5, 1978

Related U.S. Application Data

[63] Continuation-in-part of Ser. No. 483,037, Jun. 25, 1974, which is a continuation-in-part of Ser. No. 297,452, Oct. 13, 1972, Pat. No. 3,820,928, which is a continuation of Ser. No. 849,014, Aug. 11, 1969, abandoned, which is a continuation-in-part of Ser. No. 721,401, Apr. 15, 1968, Pat. No. 3,616,495.

[51] Int. Cl.$^3$ .............................................. B29C 17/02
[52] U.S. Cl. ..................................... 425/168; 264/164; 264/243; 264/327; 264/335; 425/548; 425/552; 425/556; 425/437; 425/444
[58] Field of Search .............. 264/164, 243, 335, 327; 425/436 RM, 437, 444, 548, 552, 556, 168

[56] References Cited

U.S. PATENT DOCUMENTS

| | | | |
|---|---|---|---|
| 3,708,565 | 1/1973 | Seiffert | 264/335 X |
| 3,765,810 | 10/1973 | Smarook | 425/110 |
| 3,781,402 | 12/1973 | Hanggi | 264/243 |
| 3,919,378 | 11/1975 | Smarook | 264/164 |
| 3,919,380 | 11/1975 | Smarook et al. | 264/164 |
| 3,919,382 | 11/1975 | Smarook | 264/164 |
| 3,919,445 | 11/1975 | Smarook | 264/346 X |
| 4,076,483 | 2/1978 | Smirne | 425/444 |

Primary Examiner—Thomas P. Pavelko

[57] ABSTRACT

An apparatus and method for molding articles of manufacture of resinous materials whereby, the surface of the molded article contains a pile-like texture or structure. The pile-like structure is composed of material of the surface stratum of the article and is formed by the adherence of such material to the surface of the mold cavity wall in which the article is molded and by pulling the article away from the mold cavity wall while at least the surface stratum thereof is in a deformable condition such as a semimolten or plastic state resulting from the elevated temperature thereof caused either by the manner in which it is cooled or by applying heat thereto through the mold cavity wall.

15 Claims, 8 Drawing Figures

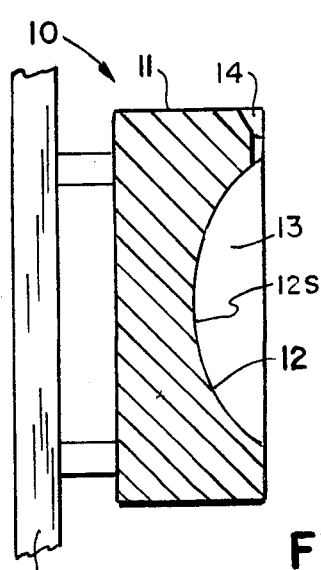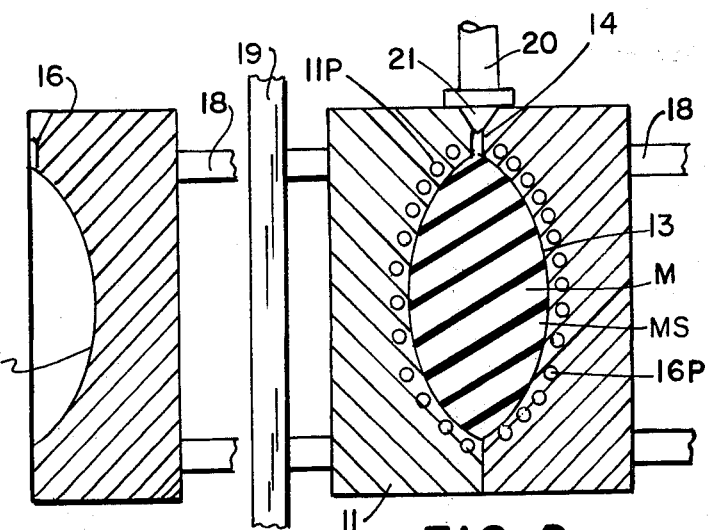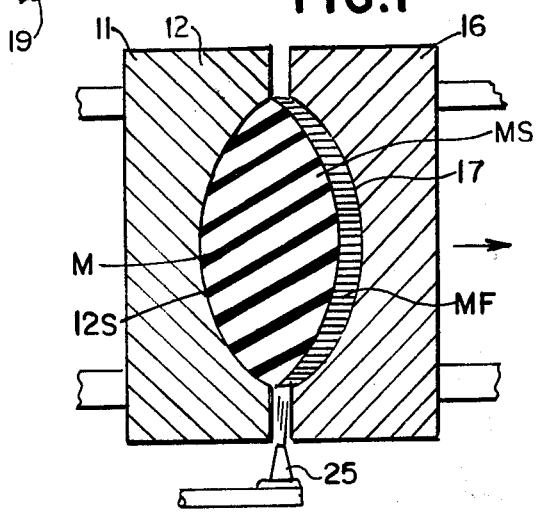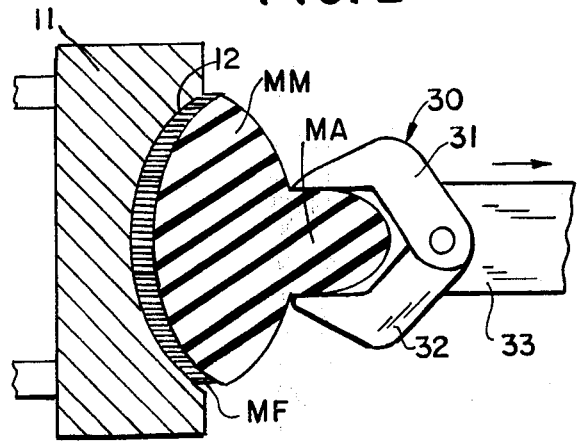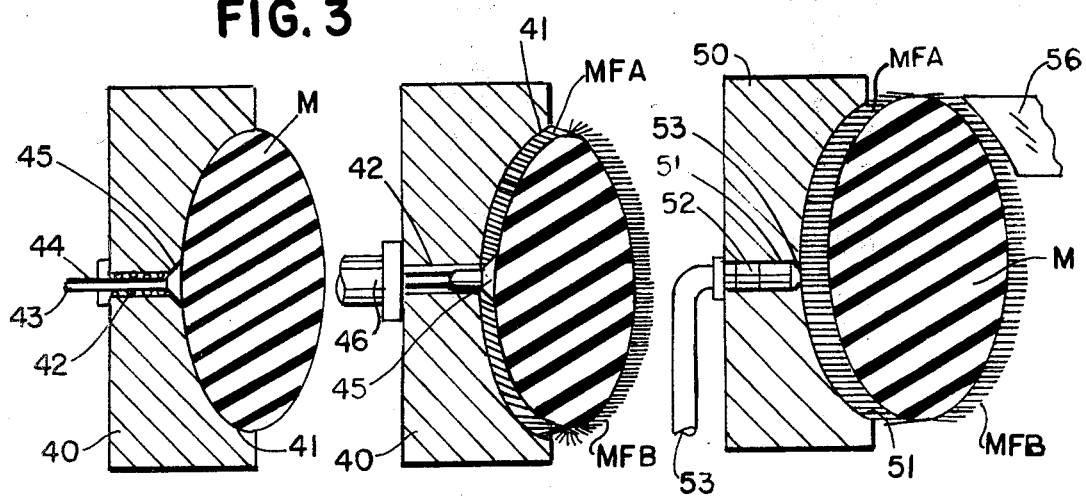

MOLDING SYSTEM AND METHOD

RELATED APPLICATIONS

This is a continuation-in-part of application Ser. No. 483,037 filed June 25, 1974 as a continuation-in-part of Ser. No. b 297,452 filed Oct. 13, 1972 now U.S. Pat. No. 3,820,928, a continuation of Ser. No. 849,014 filed Aug. 11, 1969, now abandoned, a continuation-in-part of Ser. No. 721,401 filed Apr. 15, 1968 now U.S. Pat. No. 3,616,495.

SUMMARY OF THE INVENTION

This invention relates to an apparatus and method for molding articles of plastic with a pile-like surface stratum. The pile surface is formed of the surface stratum of the molded articles during the time the articles are pulled from the mold and while the surface stratum of the molded article is in a soft, deformable condition and tacky to the surface of the mold. In one form, electronic timing or time delay control means is employed to separate the mold sections wherein the molding is held against one section and has filaments formed in its surface or surfaces when the surface of the article is separated from the other section wherein such formation is effected by the tacky or adhesive retention of portions of the soft surface stratum against the surface of the mold wall cavity as the mold is withdrawn from the surface of the article, an action which causes the softened material of the molded article to string out and form filaments. In another form, separation of the mold sections and the shape of the molded article are such as to form filaments of the surface stratum of all surface portions of the article or portions facing the cavity walls of the mold separated sections. An automatic manipulator may be employed to hold or pull the molded article from the mold at a time and in a manner to cause its surface stratum to be formed with filamentary formations. In another form, portions of the surface of the injection mold cavity wall are specially shaped to form filamentary formations of the surface stratum of the molded material by permitting spot-like adhesion between closely adjacent portions of the molding material and the mold wall surface while preventing such adhesion or reducing such adhesion between other portions adjacent to the adhered portions. In another form, molding is effected by sensing the temperature of the molding material against the surface of the mold and effecting separation of the mold and surface of the molded article when a given solid and tacky condition is effected as determined by the temperature thereat.

This invention relates to an apparatus and method for molding articles with a pile or fur-like surface utilizing one or more flexible plastic resins. The invention is also concerned with new and improved structures created by a combination of molding and post-forming molded articles or materials.

It is known in the art to produce a variety of products having a pile-like or fur-like structure which is formed by injecting or otherwise providing filamentary material in a molten substrate or adhesive coating provided on a substrate such as a textile material. Articles such as plush toys and a variety of articles of clothing are produced from so-called plush or synthetic fur materials.

The instant invention is directed to a process and apparatus and a structure formed thereby which is composed either of a substrate per se, preferably formed by molding and of irregular shape and having formed from its surface stratum a multitude of filamentary formations resembling a pile or fur. The method for forming such a structure is to cast, inject or otherwise form a synthetic plastic resin which becomes tacky or adhesive when it is molten, in a suitable mold and to controllably remove, such as by controlled pulling, the molded article from the mold while its surface stratum is in a tacky condition and is adhered to the mold surface. Such procedure may be effected, in certain instances, by suitably controlling molding variables including the temperature of the mold wall. In a particular method, an automatic controller such as a computer or a microprocessor is employed to control all mold variables and also to control the operation of a manipulator or device which is supported adjacent the mold and is employed, when the mold has been opened to expose a portion of a freshly molded article, to controllably pull the article from the mold so as to cause material of the surface stratum of the article to string out between the article and the mold surface before separating therefrom and, in so doing, to form a pile or fur-like surface structure. The apparatus may also include auxiliary means, such as a source of low temperature fluid or gas, a manipulator for nozzles ejecting same, or other means for rapidly cooling the surface stratum of the molded article after it has strung out. The auxiliary means so controlled may also include a means for manipulating one or more nozzles and ejecting therefrom a fluid, such as gas or liquid, against the surface of the mold to either assist in the removal of the material adhered thereto and/or to clean the mold surface after each or a plurality of such molding operations.

In yet another form, the auxiliary means may also include an electro-optical scanning device, such as a television scanner, and signal processing means therefor for scanning the mold surface to determine the extent of contamination due to such molding which has not been removed wherein the auxiliary means output is employed to control an automatic mold cleaning device.

Accordingly, it is a primary object of this invention to provide a new and improved apparatus and method for molding articles with a soft surface structure.

Another object is to provide an apparatus and method for molding pile surfaced articles.

Another object is to provide an apparatus and method for molding an article of soft and flexible plastic, the surface of which is processed to resemble fur.

Another object is to provide an apparatus and method for forming a plush toy directly by molding wherein the wall of the toy is a unitary molded structure.

Another object is to provide an apparatus and method for forming an article having a fur-like structure directly by molding the article and the fur-like surfaces or surfaces thereof.

Another object is to provide new and improved structures in molded articles having pile or fur-like surfaces.

Another object is to provide a computer controlled molding system for forming pile surfaced material entirely by molding a suitable plastic resin.

Another object is to provide a method for forming rotationally molded structures with pile-like surface structures.

Another object is to provide a method for vacuum forming plastic objects with soft pile-like structures.

Another object is to provide an apparatus and method for forming pile brush-like structures by molding and drawing the pile or bristles directly from the surface stratum of the molded shape.

With the above and such other objects in view as may hereafter more fully appear, the invention consists of the novel methods or molding, constructions, combinations and arrangements of parts of the molding apparatus and the structures of the molded components, as will be more fully described and illustrated in the accompanying drawings, but it is to be understood that changes, variations and modifications may be resorted to which fall within the scope of the invention as claimed.

In the drawings:

FIG. 1 is a side view of a portion of a molding apparatus having a two-part mold illustrated in cross-section wherein the mold parts are shown separated from each other;

FIG. 2 is a side view of the apparatus of FIG. 1 with the mold sections closed against each other and material molded in the cavity formed therebetween;

FIG. 3 is a side view of the apparatus of FIG. 2 with the movable mold section thereof partially separated from the other mold section and the molding having filamentary formations being formed between its surface and the surface of the movable mold cavity wall;

FIG. 4 is a modified form of the apparatus of FIG. 3 showing an automatic manipulator for engaging and controllably removing the molding from the mold cavity wall so as to form filamentary formations of the surface stratum of the molding;

FIG. 5 shows a modified form of the apparatus of FIGS. 1-3 in which a mechanical device is employed to controllably remove a molding from the mold cavity so as to form the filamentary formations of the surface stratum of the molding;

FIG. 6 is a side view of the apparatus of FIG. 5 with the molding partially ejected from the mold; and FIG. 7 is a side view in cross-section of another form of molding apparatus employing air pressure to form filamentary formations in the surface stratum of a molded article.

Figure 8:
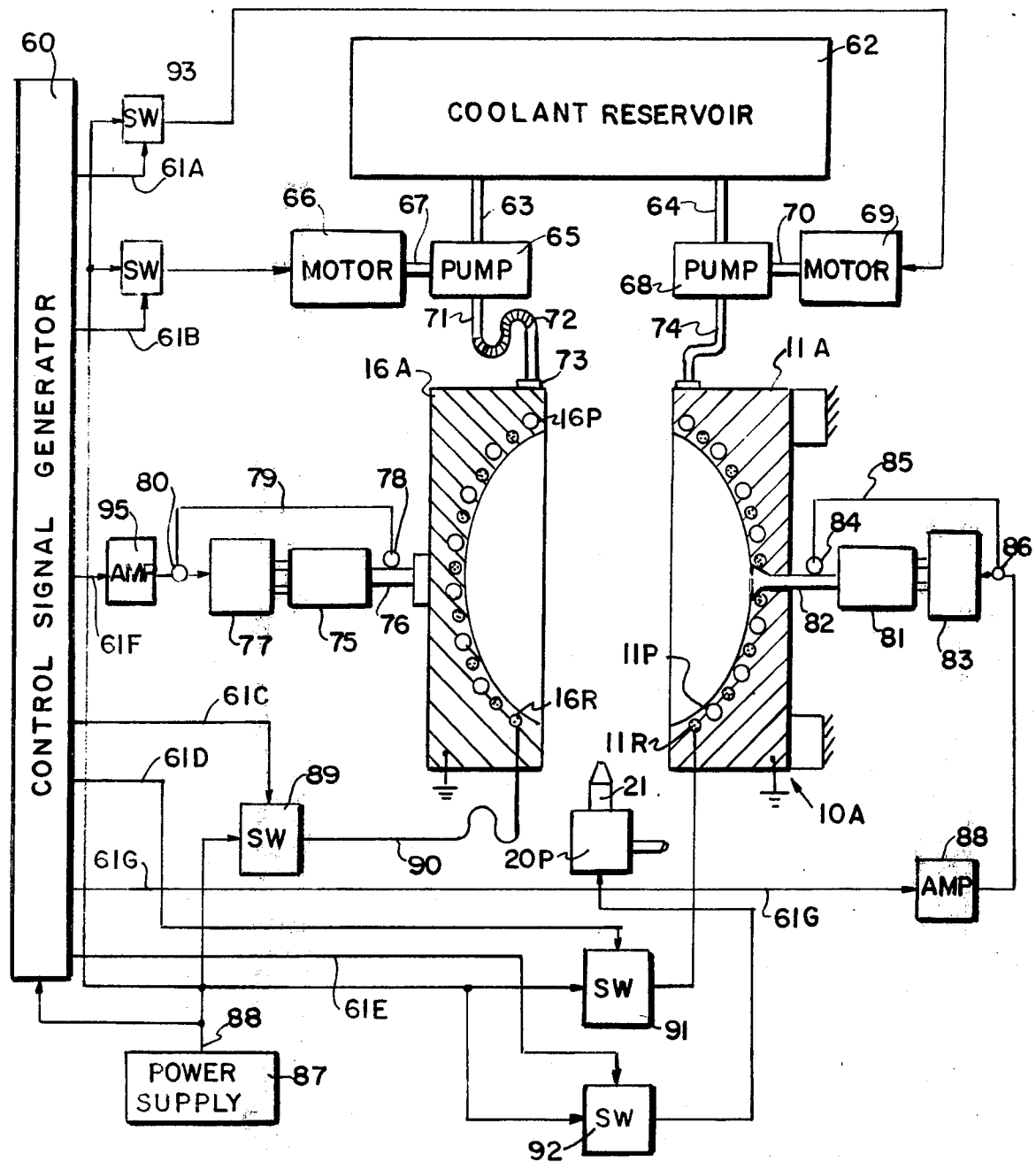
FIG. 8 is a side view of the molding apparatus illustrating the control system.

A number of techniques may be employed to form filament surfaced articles by molding in accordance with the teachings of the instant invention. These techniques are briefly noted as follows.

1. In a first method, a plastic resin capable of being fibrillated or formed with filamentary formations protruding from a surface thereof, such as a flexible or semi-flexible plastic resin, is injected or cast into a mold at an elevated temperature such that the surface stratum thereof which is formed against the surface of the mold wall cavity is in a soft and tacky condition and as such adheres to the mold cavity wall. While in such tacky condition provided by the molding temperature and before the plastic resin has had an opportunity to cool and solidify to a non-tacky condition, the molding is controllably removed from the surface of the mold cavity wall by one or more techniques such that the tacky plastic surface stratum of the molding is partially adhered to the mold cavity wall and, as such, strings out therefrom at a multitude of locations forming filaments thereof wherein the plastic resin solidifies to retain filamentary formations protruding outwardly from the surface of the molding. Depending on the characteristics of the resin, the manner in which it is cooled as or after the molding is removed from the mold and the characteristics of the surface of the mold cavity wall, the filamentary formations may have different lengths and shape characteristics. The formations may vary from short, spiny formations which simulate flocking or short hair to longer formations which simulate animal fur or human hair.

The molding may be removed from the vicinity of the surface of the mold cavity wall in a controlled manner prior to its ejection or removal from the mold by one of a number of techniques. For example, positive air pressure may be applied between the mold cavity wall and the molding in a controlled manner to ease the molding away from the mold wall and controllably form the filaments of the surface stratum thereof. The molding may also be retained against one portion of the mold by virtue of its shape, vacuum or other means, which mold portion is then controllably moved away from the mold portion containing the mold cavity wall against which the molding material is adhesively bonded so as to cause the surface stratum of the molding material to string out and form a multitude of filamentary formations thereof during such controlled movement.

In a third technique, the molding may be grasped or otherwise held by an automatic manipulator which is disposed between the mold sections after they are separated from each other and the manipulator may be controllably operated thereafter to controllably pull the molding away from the mold cavity wall surface to which it is adhered to cause the surface stratum to form filamentary formations thereof.

During any of the above-mentioned procedures, a flow of cooling air or gas may be directed between the mold cavity wall and the molding as it is removed from the wall to cool and solidify the filamentary formations formed of the surface stratum of the molding so as to control their general shape and prevent the filamentary formations from falling back into the molten molding material and either losing their shape or forming undesirable formations thereof.

To facilitate removal of the molding from the surface of the mold cavity wall after the filamentary formations have been so formed, the mold itself may be cooled or chilled by flowing a heat transfer fluid through passageways therein.

2. In a second technique, a thermoplastic resin is cast or injected into a mold and allowed to solidify from a hot molten state to a condition whereby it will retain its shape when removed from the mold. The surface of the mold cavity wall is heated by means of a heat transfer fluid flowed through the mold or by means of electrical resistance elements in the mold wall or against the surface of the mold cavity wall, in a manner such as to render the surface stratum of the molded article in the mold in a soft, tacky condition while the remainder of the article is solidified for removal from the mold. Thereafter the article is removed from the mold and the soft, tacky surface stratum which partially adheres to the surface of the mold cavity wall strings out and forms filamentary formations as it is controllably removed from the surface of the mold cavity wall.

3. In the third technique, a tacky molding material is cast or injected into the cavity of a mold having a wall with a surface against which the molding material is molded to shape, which surface is specially prepared to cause the molding material to string out and form filaments thereof when relative movement is effected between the molding and the mold section against which the molding material is cast or molded to shape. Preparation of the surface of the mold cavity may be effected by applying a material such as polytetrafluorethylene or other suitable low friction material, to selected small areas of the mold cavity wall to prevent the tacky plastic resin from adhering to such areas while permitting the tacky resin to adhere to other areas of the mold cavity wall between which the low friction material is applied, so as to facilitate the formation of filaments of the molding material when the molding is controllably removed from the surface of the mold cavity wall.

In FIGS. 1 and 2 is shown components of a molding or casting apparatus 10 which includes a stationary mold section 11 and a movable mold section 16 which may be driven into and out of engagement with the stationary section to define a molding cavity 13 therebetween as illustrated in FIG. 2. The molding cavity 13 is defined by respective cavity wall portions 12 and 17 of the mold sections 11 and 16, each shown as having a concave configuration to define respective opposite convex surfaces of an article or molding M formed therebetween by injecting a plastic resin from an injection nozzle 20 through a gate or screw forming passageway 14 disposed, as illustrated in FIG. 2, along the parting line or interface between the two mold sections when the sections are closed as shown. Mold section 16 may be movable into engagement with and away from section 11 by any suitable and conventional power operated means such as a hydraulic or air cylinder or an electric motor (not shown). When closed as illustrated in FIG. 2, the mold cavity is totally closed permitting a molten plastic polymer to be injected therein through the injection nozzle 20 to form a solid molding M of the polymer.

In FIG. 3 the mold section 16 is shown separated from mold section 11 while the molding or molded article M is retained against the surface 12S of the mold section 11 while the material of the molding M or the surface stratum thereof facing the mold section 16 and engaging the surface 12S of the mold cavity wall 12 is at an elevated temperature and in a soft, tacky condition such that it will adhere to the surface 12S and will form filamentary formations, denoted MF, when the mold sections are controllably separated, as shown. If, for example, the molding material forming the molding M is a plasticized polyvinylchloride, a low durometer ethylene vinyl acetate, a low density and tacky polyethylene, an ionomer, a flexible styrene-butadiene copolymer or other suitable resin or copolymer capable of adhering to the flat surface of a mold cavity wall of the type illustrated, a multitude of filament-like formations MF may be formed of the material of the surface stratum MS of a molding M by the stringing out or drawing of the soft, tacky polymer away from the molding as the mold sections are separated due to local adhesion of portions thereof to the surface of the moving mold section against which the polymer is molded to shape. Filament-like formations MF may solidify per se in the air space between the separated mold sections, or their solidification may be accelerated and guaranteed by a discharge of cooled gas from a plurality of ejection nozzles, denoted 25, which may be supported on the molding apparatus adjacent the mold or may be supported by one of the mold sections.

Molding M may be retained against the mold section M by one or more of a number of means while the mold section 16 is removed from the vicinity thereof so as to effect the formation of the filamentary formations MF.

One such retaining means is to provide vacuum pressure along the surface of the wall 12S of the mold cavity portion of section 11 by means of one or more passageways extending through the mold to said surface and connected to a source of vacuum pressure, either through a valve or first applying positive pressure thereto to prevent the flow of molding plastic into the passageway through which said vacuum pressure is applied. Other means for retaining the surface of the molding M against one of the mold sections while the other moves therefrom and causes a stringing out and formation of filamentary formations in the surface stratum of the opposite portion of the molding include specially shaping the surface of the mold cavity wall to retain the molding material against the desired mold section, such as section 11 of FIG. 1, while the mold section 16 is removed therefrom. An automatic manipulator or other pulling device may also be operable to grip and retain the molding M within the molding cavity formed in the molding section 11 which manipulator may be a complex device or, in its simplest form, a projectible pin or series of pins supported by one or more lineal motor actuators supported either exterior of the mold or projectible through one or more openings or passageways in the mold section 16 so as to forcibly retain the molding against mold section 11 while the filament forming process described is carried on.

Notation 11P refers to a passageway or series of passageways formed in the mold section 11 adjacent the surface 12S of the mold cavity wall while notation 16P refers to a similar passageway or series of passageways formed in the mold section 16 adjacent the cavity wall 17 thereof. If the heat transfer fluids flowed through the passageways 11P and 16P are properly controlled in their temperature, the surface stratum of the portion of the molding M which faces the wall surface 12 of the cavity of section 11 may be cooled or otherwise controlled in its temperature such that it will be retained against the wall 12 while the heat transfer fluid flowed through the passageways 16P in the mold section 16 may be heated to such a condition as to provide the surface stratum of the molding M adjacent the mold cavity wall 17 in a sufficiently tacky and soft condition to permit the formation of filaments MF projecting from the surface of the molding which faces the cavity wall 17, as shown in FIG. 3.

When the mold section 16 is fully retracted away from the molding M, the filamentary formations MF remain in the surface stratum of the molding and may be employed per se to simulate a fur-like pile surface layer formed on the molding M. The filament-like formations MF may vary from short stubble-like, stiff filaments to longer hair- or fur-like filaments which may be formed, for example, in the surface stratum of a simulated toy animal forming the molding M.

The molding M may be ejected from the mold by means of suitably placed and operable knock-out pins of conventional design forming part of the mold section 11 or assembled therewith at a convenient location.

If it is desired to form filaments MF on the entire surface of the molding M, or a suitable portion thereof beyond the surface containing the filaments illustrated in FIG. 3, the heat transfer fluid flowed through the passageway 11P may be so controlled in its temperature as to cause the surface stratum of the molding M which faces the mold section 11 to be in a soft, tacky condition after the filamentary formations MF have been formed in the opposite surface thereof, whereafter a manipulator, knock-out pin or series of such pins, positive fluid pressure, or other suitable means is applied to remove the molding M from the mold section 11 and to form filamentary formations such as MF protruding from the interface between the molding and the mold cavity wall.

In FIG. 4, a mold section 11 is illustrated and the molding MM formed thereagainst, is shown being pulled away from the mold cavity wall 12 by means of an automatic manipulator 30 which includes a retractable arm 33 and respective power operated jaws 31 and 32 which are operable to engage a select portion MA of the molding MM and to pull same away from the mold cavity as illustrated in FIG. 4 so as to form a multitude of filamentary formations MF of the surface stratum of the molding MM which faces the wall of the mold cavity, denoted 12.

By properly controlling retraction of the manipulator 30, and the transfer of heat transfer fluid through the mold wall, as described, a molding may be provided having a portion of its surface containing filaments or fur-like elements MF.

In FIGS. 5 and 6 is shown a mechanical means for removing a molded article from a mold in such a manner as to form filamentary formations of the surface stratum of the article which faces the surface of the mold cavity wall. The mold section 40, which is one of two or more similar sections adapted to come together to define a closed molding cavity and to be automatically driven apart to permit the molding M to be removed from the molding cavity, is illustrated in FIG. 5 as having a simple concave cavity defining wall 41. A passageway 42 extends through the wall of the mold section 40, in which cavity is supported a mechanism 43 including an actuator rod 44 having an expanded and tapered head 45, the outer surface of which head may be normally engaging the surface of the molding M or may be retracted therefrom and projectible by means of a suitable lineal actuator having its output shafts connected to the shaft 44 of the mechanism 43. When the shaft 44 is projected, as illustrated in FIG. 6, it engages and urges the molding M out of the cavity in such a manner that portions of the surface stratum of the molding M may be in a stringy condition and may form filamentary formations MFA, as described above, when the molding M is separated from the wall 41 of the mold cavity.

In FIG. 6, notation MFB refers to filamentary formations formed of the surface stratum of the portion of the molding M which is not formed against the cavity 41 of the mold section 40. Projection of the rod 44 inwardly through the passageway 42 and into the volume in which the molding M is formed, may be employed to urge the molding M away from the surface of the molding cavity, as illustrated in FIG. 6 and, in so doing, to form the filamentary formations MFA of the surface stratum of the molding M, assuming that the surface stratum is in a soft, tacky and stringable condition.

In FIG. 7 positive air pressure applied to the interface between an article formed in a mold and a surface of the wall of the mold, preferably after the mold has been separated and the article is retained against that section of the mold to which the positive air pressure is applied, is employed to controllably force the molding away from the mold wall while at least its surface stratum is in a tacky or formable condition as described and in such a manner that filamentary formations are formed thereof and define, when the molding is completely separated from the mold cavity wall, a pile-like surface which may vary from a very short length pile to one resembling fur.

One of the two or more mold sections, denoted 50, which make up the mold in which the article or molding M is injection molded to shape, contains a passageway 51 extending therethrough to the inside surface of the cavity wall of the mold section. Disposed within the passageway 51 is an assembly 52 which includes, in addition to a passageway therethrough through which positive air pressure may be directed and injected to the interface between the molding and the mold cavity wall. Disposed at the end of the assambly or nozzle 52 is a valve 53 which normally prevents the liquid or molten plastic resin injected into the mold cavity from backflowing therein yet which may be opened to permit air to be injected to the interface between the molding M and the mold cavity wall. The valve 53 is preferably openable to permit the ejection of gas therethrough by suitable pressure applied to the inlet line 55 from a source of such pressure such as a reservoir or a compressor and released therefrom by the controlled operation of a solenoid valve in line 55.

By suitably controlling the flow of air to the interface between the mold cavity wall and the molding M through the inlet device 52, the molding may be controllably forced away from the mold cavity wall to form filamentary formations MFA which string out from the surface stratum thereof, assuming that the surface stratum of the molding is in a molten or semimolten condition permitting such formation of filaments or pile.

The other mold section which cooperates with mold section 50 to form the molding M in FIG. 7 may be similarly equipped with means for applying positive air pressure thereto after the filamentary formations MFA have been formed in the surface of the molding M which is formed against the surface 54 of the mold cavity wall of section 50 assuming that the molding M is either shaped or in such a condition as to cause it to be retained against the other mold section when positive pressure is applied to the interface between the surface 54 and the surface of the molding M from which the formations MFA are formed. Such positive air pressure may be applied to said other mold section while it is being controllably moved away from the mold section 50 in such a manner that separation of the molding from the cavity wall thereof occurs as the filamentary formations MFB are formed of the surface stratum of the molding which faces the other mold section.

Notation 56 refers to a blade of a rotating powered bladed cutting tool which may be automatically controlled to trim the filamentary formations MFB if necessary to shorten them and/or provide them of uniform length.

While the moldings M and MM illustrated in FIGS. 2-7 are shown as solid in shape, they may also comprise hollow moldings formed by rotational casting or other means or portions of hollow moldings assembled of injection molded pieces which have been formed with filamentary formations during the molding thereof or after they are molded to shape by engaging the surfaces of such moldings in a mold or die which has been heated to render the the surface strate thereof in a soft, tacky and filamentary forming condition as described.

In FIG. 8 is shown a control diagram for one form of the molding apparatus described. Injection molding is effected in a mold 10A formed of two mold sections, 11A and 16A. Mold section 11A is stationarily supported in a conventional mold frame and base while mold section 16A is supported and movable by means of a controlled lineal actuator 75, the output shaft 76 of which is connected to the mold section or its support and is operable to move the mold section 16A into clamping engagement with the mold section 11A so as to provide a totally enclosed injection molding cavity between the two sections.

Mold section 11A contains a plurality of passageways, denoted 11P and 11R, formed therein adjacent the wall of the cavity thereof. Passageway 11D is adapted to conduct a coolant liquid which is controllably flowed therethrough from an inlet line 74 extending from the outlet of a controlled pump 68, the inlet 64 to which is connected to a reservoir or supply 62 of coolant material which may comprise chilled water or other suitable coolant.

Passageway 11R contains one or more electrical resistance heating elements therein for heating the wall of the mold section 11A, it being noted that passageways extend back and forth in sinuous or otherwise extending paths to permit the cyclic heating and cooling of the mold wall for the purposes described.

Mold section 16A contains passageways 16P and 16R. Passageway 16P is connected to an inlet line 71 which is connected to the output of a second motor operated pump 65, the inlet 63 to which extends from the coolant reservoir 62. Control motors 66 and 69 have their output shaft 67 and 70 connected to the pumps 65 and 68 for operating same in cyclic operation when it is desired to properly cool the walls of the mold sections for the purposes described. Coolant reservoir may contain cool water and suitable refrigeration means, if necessary, for the liquid coolant thereof.

Stationary mold section 11A is provided with an ejection pin or ram 82 which is operated by a controlled lineal motor or actuator 81 to retract to the position illustrated during a molding cycle and to controllably push the molding away from the mold cavity wall, as illustrated in FIGS. 5 and 6, to form the filamentary surface formations MFB of the plastic material composing the surface stratum of the molding engaging the wall of the cavity portion defined by mold section 11A. The ejection pin or ram 82 is operated by a reversible, controlled motor or actuator 81, the operation of which will be described.

Notation 20P refers to a plastic resin injection system of conventional design, such as one containing a power operated screw or ram piston for forcing molten thermoplastic material therefrom through an injection nozzle 21 of the type described to inject a predetermined quantity of such molten plastic material into the closed mold cavity defined by the mold sections 11A and 16A. In other words, notation 20P refers to the entire injection mechanism and reservoir of molten plastic resin, including the motor driving the screw or piston therefore, which motor is cyclically controlled when an input line 60E extending thereto is energized.

All of the described motors and actuators for operating the injection molding apparatus of FIG. 8 are controlled by a cycle controller, denoted 60, which may be provided in one of a number of different forms. Controller 60 may comprise a digital computer, a multi-cycle timer or controller containing a read-only memory. In perhaps its simplest form, the controller 60 may comprise a sequential signal generator such as a magnetic recorder having a magnetic record disc or endless belt containing a plurality of record tracks, each of which contains command control signals adapted to be reproduced therefrom by respective magnetic reproduction heads to generate such control signals on a plurality of outputs thereof, denoted 61A–61G, which outputs extend to the controls for the various motors and actuators described above. A first output 61A of the cycle controller 60 extends to the switching input of a normally open switch 93 which is connected to the output 88 of the power supply 87 and, when a signal is generated on the output 61A, the switch 93 is closed gating electrical energy to the input of motor 69 which thereafter operates pump 68 for pumping liquid coolant through the passageways 11P of the mold section 11A. A second output 61B from a cycle controller 60 extends to the switching input of a normally open switch 94 which, when closed by a signal generated on the line 61B as the cycle controller 60 operates, gates electrical energy from the power supply 87 to operate the pump motor 66 pumping coolant fluid through the passageway 16P of the mold section 16A.

Further outputs 61C, 61D and 61E of the cycle controller 60 connect to the respective switching and inputs of normally open switches 89, 91 and 92 which, when closed by a signal generated on said outputs, gate electrical energy from the power supply 87 respectively to the electrical resistance heating elements in the passageways 16R and 11R and to the input for operating the motor driving the resin injecting means provided in the plastic injection system 20P for suitably supplying injection molding material through the injection nozzle 21 when it is operatively located at the inlet to the closed mold.

While the motors 66, 69 and the motor located within the injector 20P, are all operated at substantially constant speed whenever their inputs are energized, it is noted that any of these motors may also be variably controlled in their operation during a molding cycle by means which will be described hereafter and which are associated with the motors or servos 75 and 81 controlling movement of the mold section 16A and the ejection pin or ram 82. These latter motors 75 and 81 are variably controllable in accordance with the characteristics of the analog or digital signals applied to the controls therefore so as to permit the controlled movement of the mold section 16A away from mold section 16 and the controlled movement of the pin or ram 82 into the mold cavity, to controllably for the filaments MFA and MFB as effected, for example, in the apparatus illustrated in FIGS. 3, 5 and 6 when the mold sections are controllably moved apart or separated and the ejection means or pin 43 controllably separates the molding from the mold cavity wall.

Controlled movement of the shaft 76 of the mold lineal actuator 75 and the shaft or pin 82 of the lineal actuator 81 may be effected in a number of manners, for example by the means illustrated in my U.S. Pat Nos. 3,422,648; 3,412,431; and 3,616,495. Typically, the motor or ram 75 driving the mold section 16A toward and away from the mold section 11A may be operated in accordance with the teachings of FIG. 1 of my U.S. Pat. No. 3,616,495 in which an injection mold section is controlled in its movement to close and open with respect to a stationary mold section for the purpose of permitting a molding formed in a mold to expand therein and for varying the clamping force during a cycle of operation. As taught in said patent, the motor or servo device 75 may comprise a hydraulic cylinder motor which is both variably displacement and speed controllable by a controlled electrohydraulic servo system 77 which operates in response to a variable command signal, such as a variable analog signal generated on the output of an amplifier 95 which receives such command control signal from the command control signal generator or cycle controller 60 as generated therein by reproducing same from a particular track of the multiple track magnetic recording element thereof, the reproduction head for which is connected to the output 61F.

The electrohydraulic servo system 77 includes, as set forth in U.S. Pat. Nos. 3,616,495 and 3,422,648, a plurality of controlled components including an electric stroker which varies its output in accordance with variations in the command control signal received on an input thereto from the amplifier 95, a hydraulic stroker which is operatively connected to the output of the electric stroker and a variable displacement hydraulic pump which is operated by the hydraulic stroker to vary its output in accordance with variations in the operation of the hydraulic stroker. The characteristics of the variable displacement hydraulic pump provided within unit 77 are such that, depending on the position of the slide block thereof, which is controlled by the electrohydraulic stroker, it may pump in either direction and hence, the position as well as the direction of movement of the ram or shaft 76 of the hydraulic cylinder 75 and the rate of travel of said ram, will be a function of the characteristic of the signal generated on the output of the amplifier 95 during the particular portion or portions of the molding cycle in which the mold section 16A is closed against mold section 11A and when the mold section 16A is controllably removed from the mold section 11A during the formation of the filaments formed between the surface of the molding and the mold cavity wall which separate from each other by the means illustrated in FIG. 3.

Feedback means is provided for controlling the actuator or motor 75 to assure that the degree and rate of movement of its shaft is actually effected in accordance with the characteristics of the command control signal generated by the controller 60. Such feedback control is effected by means of a feedback potentiometer 78 having a drive or wiper arm which is coupled by means of gears or other means to the ram or shaft 76 for varying the setting of the potentiometer in accordance with the bi-directional movement of the shaft 76 whereby the value of the resistance of the potentiometer is a function of the location of such shaft. Thus the voltage generated on the output 79 of the potentiometer 78 is fed back to a comparator, such as a summing amplifier 80 and bucked against the voltage generated by the potentiometer, resulting in the generation of a difference signal or voltage which is fed to control the electric stroker located within the unit 77. By varying the amplitude of the command control signal generated on the output 61F, during a cycle of operation, the speed and degree of movement of the mold section 16A may be variably controlled to effect the desired results and the formation of suitable filaments protruding from the surface or surfaces of the molding as shown in FIG. 3.

The same mode of control employed to control mold movement, as described above, may be employed to control the movement of the ejector or pin 82 outwardly from the surface of the mold cavity wall to controllably move the molding therefrom for forming the filaments MFA as shown, for example, in FIG. 6. A hydraulic ram 81 has its output shaft connected to the pin or ejector 82 and is controlled in its speed and movement into the mold cavity by a control unit 83 having similar components to those provided in unit 77 wherein a variable potentiometer 84 has its feedback circuit 85 connected to as summing amplifier 86 which is also adapted to receive a variable amplitude command control signal generated on a sixth output 61G of the command control signal generator 60 as reproduced from a respective record channel of a magnetic recording member thereof, such as a multi-channel endless magnetic tape or magnetic disc. Output 61G extends to an amplifier 88 in which the variable analog signal is amplified and fed to the summing amplifier or comparetor 86 for controlling the devices denoted 81 and 83 as described.

Notation 72 refers to a flexible hydraulic line between the pump 65 and input 73 to the coolant passageway 16P of the mold section 16A and notation 90 refers to a flexible line extending from the output of the switch 89 to the resistance heating element or elements 16R of the mold section 16A, both such flexible lines being employed to account for the movement of the mold section 16A.

While the apparatus illustrated in FIG. 8 employs the controlled separation of the mold sections to form filamentary formations on one surface of the molding and the controlled ejection of the molding from the mold to form similar filamentary formations on another surface thereof, it is to be noted that combinations of the filamentary forming means illustrated in FIGS. 1–7, other than illustrated in FIG. 8, may be employed to controllably form filamentary formations on either or both sides of a molding, by making suitable variations or changes in the system illustrated in FIG. 8. In other words, if air pressure is employed as described above to either or both eject the molding from the surface of the mold or retain it thereagainst while the mold sections are separated, to form the filamentary formations, such means may be suitably controlled in a system of the type shown in FIG. 8 by the sequential generation of control signals on respective outputs of the cycle controller 60 and the application of such control signals to open normally closed solenoid valves to effect the application of suitable air pressure to the interface between the molding and the surface of the mold cavity wall of either ejecting or retaining the molding with respect to the mold cavity wall.

The means illustrated in FIG. 8 for controlling the flow of coolant liquid to the passageways in the mold sections to properly cool the mold walls and the electrical energy applied to the resistance heating elements embedded within the mold walls, may be employed to cyclically heat and cool the mold walls in a cycle of operation for the purposes described, e.g.—providing the surface stratum of the molding in a soft tacky condition whereby it may be formed into filaments upon separation from the surface of the mold cavity wall and suitably cooling the surface or surfaces of the molding to either prevent such formation or retain the molding within one of the mold sections while the other section thereof is separated from the molding and forms the filamentary formations thereof by such separating action.

Although not illustrated, coded, pulse or analog signals generated on other outputs of the cycle controller 60 in sequence with the described signals, may be employed to control the operation of additional devices such as the manipulator 30 of FIG. 4, the flow of coolant to the nozzle 25 of FIG. 3 and the blade trimming means 56 of FIG. 7 for properly trimming the filaments formed about the surface of the molding.

It is also noted that the molding apparatus may comprise one which molds by means other than injection molding, such as a rotational molding apparatus, a compression molding apparatus, a slush molding apparatus, a vacuum forming apparatus or other suitable apparatus for molding a plastic resin between mold or die sections wherein the surface stratum of the molding may be rendered or provided in a soft, tacky and filamentary forming condition prior to the separation of the mold section or sections from the surface of the molding to effect the formation of such filamentary formations. Means may be employed as described in FIGS. 1-8, such as the controlled removal of a mold or die section from the molding, the controlled operation of a manipulator removing the molding from the mold or die, the controlled ejection of the molding from the surface of the mold by mechanical or air pressure means or other suitable means to effect the above mentioned formation of filamentary formations.

I claim:

1. Molding apparatus comprising in combination:
   a mold having a closed molding cavity with the wall of said cavity defining a surface against which a moldable material may be formed to shape,
   means for opening and closing said mold,
   means for flowing a quantity of thermoplastic resin into said cavity to cause said resin to contact the wall of said cavity and to adhere to the surface of said mold cavity wall,
   means for solidifying the major portion of the thermoplastic resin flowed into said mold cavity to form a molding of defined shape,
   means for controlling the temperature of the surface stratum of at least a portion of the molding while it is disposed in said mold cavity to retain the material of said surface stratum in a tacky condition permitting it to adhere to the mold cavity wall after the remaining portion of the molding material solidifies within the mold cavity,
   means operable after the material disposed in said mold cavity has been molded to shape and has defined a molding for effecting relative movement between said molding and a portion of the mold cavity wall wherein said means is also operable to cause portions of the material adhering to the mold cavity wall to be held thereagainst while effecting such relative movement so as to string out and to form a pile-like surface of the surface stratum of said molding which pile-like surface is composed of a multitude of filamentary formations of the material of the surface stratum of said molding.

2. An apparatus in accordance with claim 1 wherein said means for effecting relative movement between said portion of said mold and the molding formed therein comprises means for applying suction between said molding and part of said mold cavity wall to hold said molding thereagainst while effecting relative movement between respective parts of said mold including the mold part holding said molding by fluid pressure.

3. An apparatus in accordance with claim 1 including first heat transfer means supported by said mold for maintaining the temperature of the wall of the mold cavity high enough to maintain the surface stratum of the molding in a tacky condition and second heat transfer means for cooling and setting the remaining portion of the molding material to define a molding thereof of defined shape.

4. An apparatus in accordance with claim 1 wherein said mold is composed of first and second mold sections, means for retaining the molding formed in said mold cavity against said first section of said mold while opening said mold during at least the initial portion of the mold opening operation and while a portion of the surface stratum of the molding adheres to at least a portion of the surface of the wall of the cavity of the second mold section to cause material between said molding and the second mold section to string out from the molding and to form said pile-like surface on said molding.

5. An apparatus in accordance with claim 1 wherein said means for effecting relative movement between said portion of said mold and the molding formed therein comprises an article manipulator supported adjacent said mold and means for controlling movement of said article manipulator to engage the molding and to urge its movement with respect to said portion of said mold with which said relative movement is effected.

6. An apparatus in accordance with claim 1 wherein said mold is a multiple-part injection mold and said means for effecting relative movement between said portion of said mold and the molding formed therein comprises means for moving parts of said multiple-part mold with respect to each other and means for retaining the molding formed within the mold against one of the parts of said mold being separated.

7. An apparatus in accordance with claim 5 including means for operating said manipulator to engage and pull said molding away from said portion of said mold with which relative movement is effected with said molding.

8. An apparatus in accordance with claim 6 including master control means for controlling the molding operation and the operation of said manipulator to effect their synchronized operation.

9. An apparatus in accordance with claim 1 wherein said means for effecting relative movement between said portion of said mold and the molding formed therein comprises fluid pressure applying means supported by said mold.

10. An apparatus in accordance with claim 9 wherein said fluid pressure applying means includes means for ejecting fluid under pressure between said molding and the mold cavity wall to force said molding away from said mold cavity wall.

11. An apparatus in accordance with claim 9 wherein said means for applying fluid pressure includes at least one fluid passageway extending through at least one part of said mold and a source of fluid pressure which varies from atmospheric pressure connected to said passageway.

12. An apparatus in accordance with claim 1 including fluid passageway means extending through at least one of the parts of said multiple part mold and means for flowing a heat transfer fluid through said fluid passageway means to control the temperature of the surface stratum of the molding formed within said mold.

13. An apparatus in accordance with claim 12 wherein the heat transfer fluid flowed through said fluid passageway means is a heated fluid and means for flowing said heated heat transfer fluid through the wall of said mold wherein said fluid operates to transfer sufficient heat through the wall of the mold to provide the surface stratum of the molding in said tacky condition after the remaining portion of the molding has become set in said mold cavity.

14. An apparatus in accordance with claim 1 wherein said means for effecting relative movement between said portion of said mold and the molding formed therein comprises a mechanical device supported by said mold and operable to engage the molding in the mold cavity and to controllably urge said molding away from a portion of the mold cavity wall.

15. An apparatus in accordance with claim 14 wherein said device is operable to push against a portion of the surface of the molding formed in said mold and to urge said molding away from the surface of the mold cavity wall.

* * * * *